INVENTOR.
Alvin D. Dahl

Patented Nov. 23, 1948

2,454,733

UNITED STATES PATENT OFFICE 2,454,733

METHOD OF MAKING DENSE MAGNESIUM OXIDE

Alvin D. Dahl, Midland, Mich., assignor to The Dow Chemical Company, Midland, Mich., a corporation of Delaware Application March 13, 1947, Serial No. 734,325

5 Claims. (Cl. 23—201)

The invention relates to a method of making magnesium oxide in a dense form. It more particularly concerns a method of making magnesium oxide by reacting magnesium and oxygen, whereby the reaction product is obtained in the molten state and subsequently solidified in a dense form.

The principal object of the invention is to provide a method of making magnesium oxide which is dense and hard and possesses high electrical resistance, a combination of properties which renders the material useful in the electrical industry. Other objects and advantages will appear as the description proceeds.

I have found that by introducing molten globules of magnesium into an atmosphere of oxygen the molten magnesium burns quietly and the product of the burning is magnesium oxide largely in molten form rather than dust or fume. On cooling the magnesium oxide so produced, it solidifies to an unusually dense crystalline product most of which is translucent to transparent. In addition it is highly electrically resistant so that it is useful in the electrical industry especially for insulating electrical resistance heating elements that are encased in metallic sheaths.

The invention, then, consists of the method hereinafter more fully described and particularly pointed out in the claims, the following description and accompanying drawing setting forth a preferred mode of carrying out the invention, such as mode illustrating, however, but one of the various ways in which the invention may be practiced.

Figure 1:
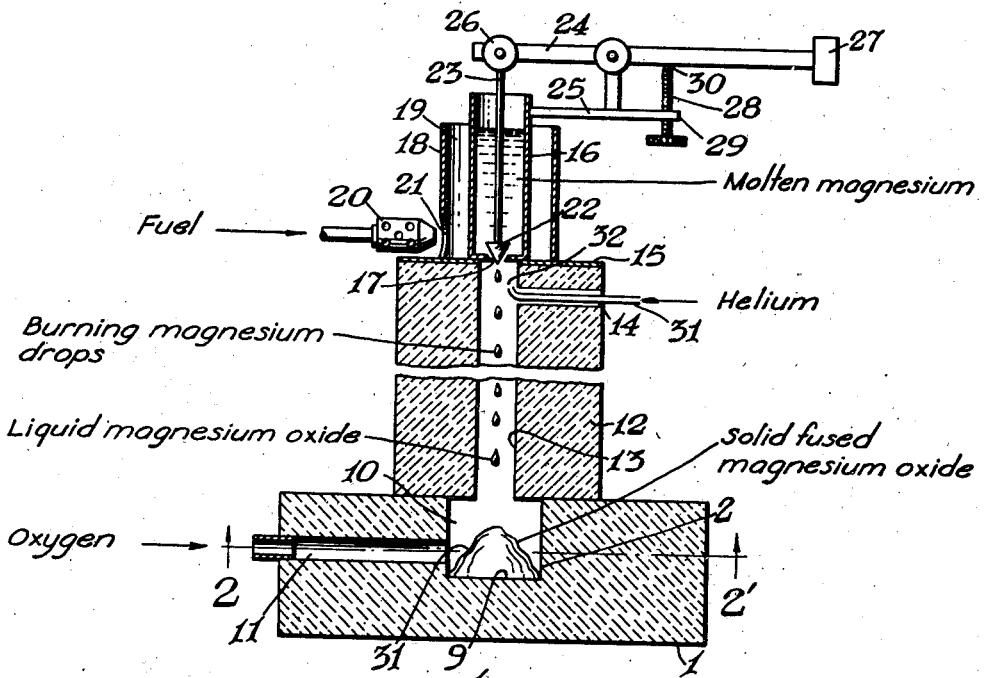
Figure 2:
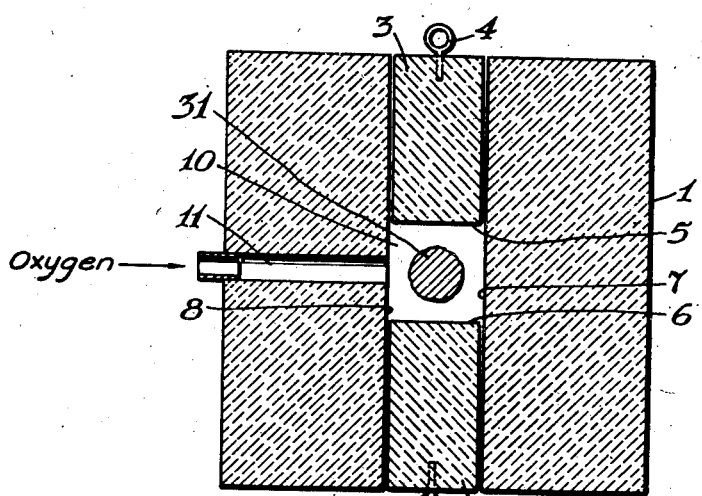

In the drawing, Fig. 1 is a schematic view largely in section of a side elevation of an apparatus with which the method may be practiced. Fig. 2 is a horizontal cross section on the line 2—2 of Fig. 1.

As shown in the drawing, the apparatus comprises a refractory base 1 across the upper portion of which is formed a trough 2. Slidably fitting the ends of the trough are the removable refractory closure blocks 3 provided with handles 4. The inner ends 5 and 6 of the blocks and the portions 7 and 8 of the trough comprise the sides, and the portion 9 of the trough comprises the bottom, of the hearth 10. A lateral passage 11 is formed in the base 1, providing communication to the hearth for the introduction thereinto of oxygen. A refractory tower 12 having an axial furnace shaft 13 or combustion zone is disposed vertically above the hearth 10. A vent 14 is provided near the upper end 15 of the tower. The refractory portions of the foregoing apparatus are made preferably of magnesite brick. Upon the plate 15 on the upper end of the shaft rests a melting pot or crucible 16 (preferably of steel) which is adapted to melt and hold a quantity of molten magnesium. A valved aperture 17 is provided in the bottom of the crucible centrally disposed over the shaft 13. A jacket 18 is arranged around the melting pot so as to provide a heating zone 19 surrounding the sides of the crucible 16 for combustion gases delivered from the burner 20 through the port 21. The size of the passage through the aperture 17 is regulated by the cone shaped valve 22 which is mounted on the lower end of the valve stem 23. Regulation of the valve is accomplished by the weighted lever 24 which is pivoted on the support 25 attached to the melting pot. As shown, on one end of the lever 24 is pivoted the upper end 26 of the valve stem 23, on the other is a weight 27 capable of overbalancing the weight of the valve and valve stem. Screw means 28 threaded through the extension 29 of the support 25 engages the lever arm at 30 to regulate its position and thus that of the valve 22.

The operation of the method will be best understood from the following description in which magnesium is oxidized with gaseous oxygen to produce a solidified fused magnesium oxide, the fusion resulting from the intense heat of the oxidation reaction. In carrying out the method using the apparatus illustrated, a quantity of magnesium metal is charged into the crucible 16 and its temperature maintained above the melting point of magnesium (651° C.) by the burner 20, valve 22 being in the down position so as to close aperture 17 as by adjusting screw means 28 upwardly to a suitable level. A stream of oxygen is admitted to passage 11 from which it flows into the hearth 10 and upwardly therefrom into the shaft 13. Screw means 28 is then turned slowly so as to raise valve 22 until a dropwise flow of molten magnesium is released from aperture 17 into the combustion shaft 13 where it is met by the ascending oxygen. Upon coming into contact with the oxygen, the magnesium globules rapidly oxidize or burn with a white flame producing a large amount of heat at a sufficiently high temperature to fuse the major portion of the resulting magnesium oxide which forms large enough masses to fall readily to the floor 9 of the hearth 10 while a small proportion escapes as fume or dust through the vent 14. As the fused magnesium oxide falls, it cools and gradually forms a pile of solidified fused product 31. The solidified fused product that is collected on the hearth may be removed by removing the closure blocks 3 and pushing the pile beyond one end or the other of the trough 2. Following removal, the product may be crushed if desired to form a granular product of desired mesh size.

Various rates of flow of either the molten metal or oxygen are permissible, however, if the proportion of oxygen to magnesium is less than that called for by stoichiometrical proportions given in the equation:

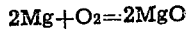
$$2Mg + O_2 = 2MgO$$

an impure product results. On the other hand, if very much more oxygen is used than the stoichiometrical proportions, the reaction temperature may be lowered and the product fail to attain a sufficient density. In general, best results are obtained when a moderate excess of oxygen is used. I have found, for example, that by using about 30 to 70 per cent (or preferably about 50 per cent) more oxygen than stoichiometrical proportions a satisfactory product is obtained, and there is only a small loss of magnesium oxide as dust or fume since the major portion forms coarse granules and larger masses.

Inasmuch as there is a tendency for the oxidation of the magnesium to begin immediately the metal enters the oxygen atmosphere below the aperture, oxide may accumulate about and in the aperture and interfere with the dripping of the molten metal into the combustion zone of the shaft 13 on prolonged or repeated use of the apparatus. This difficulty, I have found, may be overcome by introducing helium, or other gas inert to magnesium, into the upper end of the shaft 13 in the vicinity of the aperture 17 so as to displace oxygen from immediate contact therewith. This may be accomplished by directing a small stream of helium gas toward the aperture 17 as by means of a tube 31 inserted through the vent 14 so that the discharge end 32 is positioned in the shaft space in the vicinity of the aperture as shown.

The length of travel of the magnesium globules in the shaft 13 during combustion and hence the duration of the time of contact between the magnesium globules and the oxygen necessary to obtain complete oxidation of the magnesium is comparatively small. For example, in one set of tests, I found that a free fall of about 9 inches in an oxygen atmosphere preheated to 800° C. was sufficient to burn completely each globule of molten magnesium. In practice, the free fall may be made long enough to provide for both complete oxidation and cooling of the oxide produced. For example, I have found that a shaft height giving a free fall to the globules of 7½ feet is ample both for oxidation and subsequent cooling.

Although I have illustrated in the drawing the passage of the oxygen in countercurrent flow to the descending globules of molten magnesium, I have found that the oxygen may be introduced into the shaft through the vent 14 instead of the passage 11, thereby flowing the oxygen and the magnesium in the same direction. When adopting such mode of operation, the passage 11 serves as a vent.

It will be understood that very high temperatures are attained in the shaft and that some provision for cooling is necessary for prolonged operation as by directing an air blast against the outer surface or embedding cooling means in the refractory work of the shaft itself.

Fused magnesium oxide produced by the foregoing method and then crushed so as to pass a 40 mesh standard sieve but not a 300 mesh standard sieve has a bulk density of about 2.4 to 2.6 grams per cubic centimeter and a very high electrical resistance.

I claim:

1. The method of making magnesium oxide in solidified fused form which comprises introducing globules of molten magnesium into an atmosphere of oxygen whereby the globules burn forming magnesium oxide, said globules having a free fall of sufficient duration in the said atmosphere of oxygen to complete their oxidation.

2. The method of making magnesium oxide in solidified fused form which comprises dripping molten magnesium into an atmosphere of oxygen whereby the drops of magnesium burn forming fused magnesium oxide, and solidifying and collecting the resulting magnesium oxide product.

3. The method of making magnesium oxide in solidified fused form which comprises dripping molten magnesium into an atmosphere of oxygen whereby the drops of magnesium burn forming fused magnesium oxide, introducing oxygen into the said oxygen atmosphere at a rate 30 to 70 per cent greater than that corresponding to the stoichiometrical proportions of magnesium and oxygen, and solidifying and collecting the resulting magnesium oxide product.

4. The method of making magnesium oxide in solidified fused form which comprises dropping molten globules of magnesium into an upwardly moving column of oxygen, the oxygen being about 30 to 70 per cent in excess of the stoichiometrical proportion to magnesium, whereby the magnesium burns to magnesium oxide, and collecting the resulting product.

5. The method of making magnesium oxide in solidified fused form which comprises introducing magnesium into an atmosphere of oxygen highly heated by the burning therein of previously introduced magnesium whereby the magnesium burns forming fused magnesium oxide, supplying additional oxygen to the said oxygen atmosphere at a rate 30 to 70 per cent greater than that corresponding to the stoichiometrical proportions of magnesium and oxygen, solidifying and collecting the resulting magnesium oxide product, and introducing into the said oxygen atmosphere in the vicinity of the point of introduction of the said magnesium a gas inert to the magnesium whereby oxidation of the magnesium at the point of introduction is prevented.

ALVIN D. DAHL.

No references cited.